March 7, 1961 M. G. BROWN 2,973,580
APPARATUS FOR USE IN ANALYZING BLOOD
Filed Sept. 24, 1958 5 Sheets-Sheet 1

INVENTOR
MORDEN G. BROWN
BY Louis L. Gagnon
Noble J. Williams
ATTORNEYS

March 7, 1961 M. G. BROWN 2,973,580
APPARATUS FOR USE IN ANALYZING BLOOD
Filed Sept. 24, 1958 5 Sheets-Sheet 2

INVENTOR
MORDEN G. BROWN
BY Louis L. Gagnon
Noble J. Williams
ATTORNEYS

March 7, 1961 M. G. BROWN 2,973,580
APPARATUS FOR USE IN ANALYZING BLOOD
Filed Sept. 24, 1958 5 Sheets-Sheet 3

INVENTOR
MORDEN G. BROWN
BY Louis L. Gagnon
Noble S. Williams
ATTORNEYS

March 7, 1961 M. G. BROWN 2,973,580
APPARATUS FOR USE IN ANALYZING BLOOD
Filed Sept. 24, 1958 5 Sheets-Sheet 4

INVENTOR
MORDEN G. BROWN
BY
ATTORNEYS

INVENTOR
MORDEN G. BROWN
ATTORNEYS

United States Patent Office 2,973,580
Patented Mar. 7, 1961

2,973,580
APPARATUS FOR USE IN ANALYZING BLOOD

Morden G. Brown, Woodstock, Conn., assignor to American Optical Company, Southbridge, Mass., a voluntary association of Massachusetts Filed Sept. 24, 1958, Ser. No. 763,083

9 Claims. (Cl. 33—125)

This invention relates to apparatus for rapidly and accurately analyzing certain physical properties of whole blood. More particularly, the invention relates to improved apparatus of such construction and arrangement that a technician or user thereof may readily measure in an efficient and highly accurate manner the relative proportions of certain blood components within a very small sample of centrifuged whole blood, such as the percentage volume of red corpuscles in said sample, or the percentage volume of the buffy layer of such a sample, or the percentage volume of plasma thereof or all of these values. The apparatus also includes means for aiding in the determination of other blood values such as mean cell hemoglobin concentration, or mean cell volume, as will appear hereinafter, when the percent value for red cells has been accurately determined. Even rates and amounts of leucocyte migration into the plasma during preselected time intervals can be measured or studied.

It is, accordingly, an object of the present invention to provide improved apparatus by which one or more of the above-mentioned blood values in a suitably prepared sample of whole blood may be readily and accurately determined.

It is also an object of the invention to provide apparatus of the above character which requires a minimum amount of whole blood for use in determining any one or more of said blood values.

It is a further object of the invention to provide apparatus of the above character which is of such sturdy and compact construction and of such an arrangement that same may be readily moved from place to place, as desired, and used in a hospital laboratory or the like, without requiring an appreciable amount of bench space, special environments or the like.

It is an additional object of the invention to provide means in the form of a computer board or the like constructed and arranged as a functional part of the apparatus in such a way that additional desirable blood values may be readily determined as soon as the percentage volume of red cells has been accurately established by use of the apparatus.

Other objects and advantages of the invention will become apparent from the detailed description which follows when taken in conjunction with the accompanying drawings in which.

The volume of red corpuscles in a sample of whole blood expressed as a percent of the total volume of the sample is commonly referred to as the hematocrit value of the blood. This value can be conveniently determined by placing a small quantity of whole blood in an elongated tube and centriguging same so as to separate the red cells from the plasma etc. and measuring the related proportions thereof.

Figures 1, 1A, 1B:
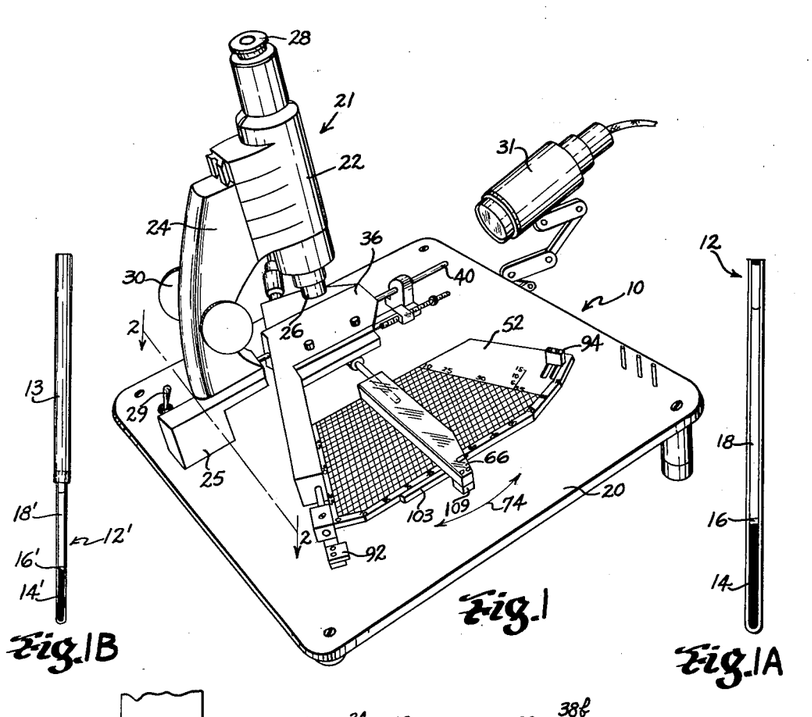
Fig. 1 is a perspective side-front view of a preferred form of apparatus embodying the present invention.
Figs. 1A and 1B are enlarged elevational views of two forms of centrifuge tubes which may be used in the apparatus of Fig. 1.

In Fig. 1 is shown at 10 convenient and highly accurate apparatus for use in determining the hematocrit values of blood samples and in Figs. 1A and 1B are indicated 12 and 12' two hematocrit tubes of different types for use in the apparatus of Fig. 1. Either of these tubes would be placed in a centrifuge of known type and rotated at a speed of about 12,000 r.p.m. for a period of approximately five minutes to drive all of the red corpuscles 14 or 14' toward the outer closed end of the tube. In fact, at such time, a thin layer 16 or 16', called the buffy coat will also be formed in the tube next to the concentration of red cells, and above the buffy coat will be collected the clear plasma 18 or 18'.

Two different standard sizes of hematocrit tubes are in common use at the present time; the larger size tubes (see Fig. 1A) being 75 mm. in length and having a 1.0 mm. bore, and the smaller size tubes (see Fig. 1B) being 32 mm. in length and having a 0.5 mm. bore. Notwithstanding the difference in size of these two tubes, hematocrit values of centrifuged samples of blood in either type of tube may be accurately measured by the improved apparatus of the present invention. However, when the smaller size tube 12' is to be used, it will be equipped with an adaptor 13 fitting over the upper end thereof, as indicated, so that the overall length thereof will more or less equal that of the large size tube 12. Nevertheless, if a centrifuged sample is provided in tube 12' which is like that in tube 12, the percentage volumes of the red cell column, the buffy coat value and the plasma value for one tube will be the same as that for the other if necessary initial adjustments for both have been made. In fact, in both arrangements, the measurements are highly accurate and so accurate that significant values for the small size buffy coat in a sample (comprising white corpulscles and platelets) may also be measured.

It is very desirable in hospital laboratory work, clinical work or the like to be able to rapidly and accurately determine the hematocrit value of blood samples since from such values, other important information concerning blood conditions can be obtained. For example, when the hematocrit value for a blood sample and the hemoglobin concentration value thereof (obtained by other means) are known, the mean cell hemoglobin concentration can be readily determined. Also, when the hematocrit value is known and the red corpuscle count of the same sample can be established, the mean red cell volume can be readily determined.

The hematocrit measuring apparatus of the present invention operates on the geometric principles of proportional relations of corresponding sides of similar triangles and is such that blood samples of appreciably varying sizes contained within either the large or small size hematocrit tubes may be placed therein and accurately measured. Based on such principles, the preferred apparatus of Fig. 1 comprises a main supporting plate 20 which is held in a slightly forwardly tilted position by a pair of front and a pair of back legs of different lengths so that a microscope having a body tube 22 carried by a supporting arm 24 and block 25 secured to main supporting plate 20 will be conveniently arranged for a technician or the like using the apparatus. The body tube carrying an objective 26 and an adjustable eyepiece 28 (preferably of an intermediate power) may be moved vertically by an adjustment mechanism 30 of conventional construction for focusing purposes and said mechanism is preferably of a coarseness intermediate that generally provided on laboratory microscopes equipped with both coarse and fine adjustment mechanisms.

A light source 27 controlled by double throw switch 29 is provided under the plate 20 and in optical alignment with said microscope. Instead of such illumination of the sample in centrifuge tube 12 from below, it may be at times, as will later appear, better to provide oblique illumination of the sample from above and such can be accomplished by a conventional microscope lamp 31 carried by and adjustable in known fashion relative to the supporting plate 20. This light source 31 could also be controlled by double throw switch 29. When in one position, source 27 would be energized and when in the other, source 31 would be energized.

The microscope eyepiece is of ordinary construction but of a type having a pair of cross hairs so that transverse lines of demarcation between different parts of the sample in centrifuge tube 12, for example, may be accurately aligned with the transverse line of the cross hairs or the point of intersection of the lines when the tube 12 is placed in the apparatus 10 and adjusted for measurements thereby.

Figure 2:
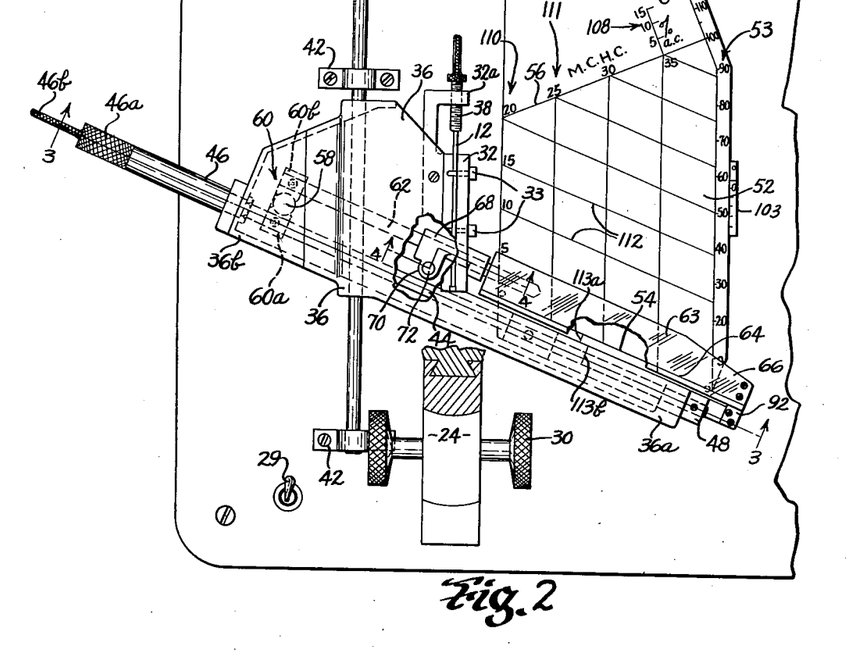
Fig. 2 is a plan view of the base portion of the apparatus of Fig. 1, said view having been taken substantially upon section-line 2—2 of Fig. 1 and looking in the direction of the arrows.
Figure 4:
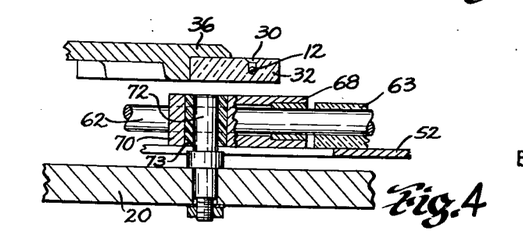
Fig. 4 is a fragmentary vertical sectional view taken substantially upon section-line 4—4 of Fig. 2 and looking in the direction of the arrows.
Figures 5, 6, 7:
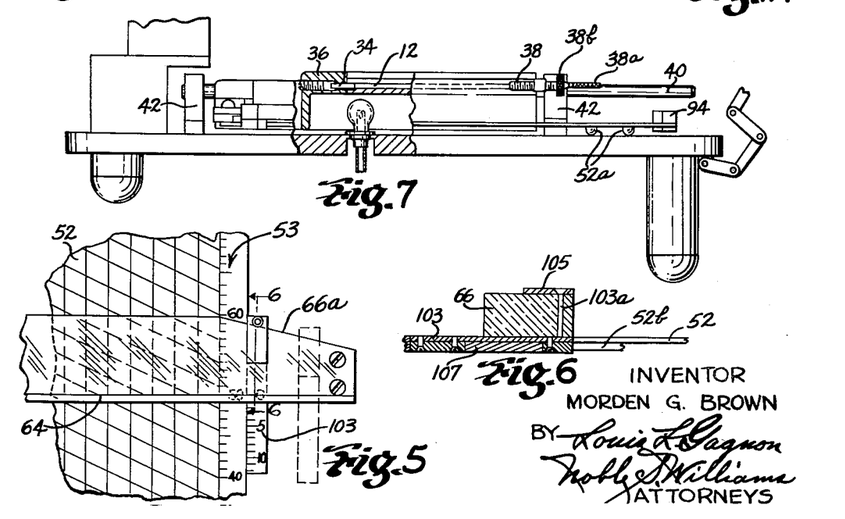
Figs. 5 and 5A are enlarged fragmentary plan views of parts of the apparatus of Fig. 2 in two different positions of adjustment thereof.
Fig. 6 is a sectional view taken substantially upon section-line 6—6 of Fig. 5.
Fig. 7 is a side elevational view of a part of the apparatus of Fig. 1, certain parts being broken away to better show the structure arrangement thereof.

As best shown in Figs. 2, 4 and 7, the hematocrit tube 12 after centrifuging (and "sealing in" of the upper end by a flame or with plasticene clay or the like, if desired, to prevent evaporation, etc.) is placed in a groove 30 (Fig. 4) in a translucent plastic tube carrier 32 with its closed end pressing against the recessed end of a spring pressed plunger 34 carried in a movable main supporting block 36. The opposite end of the tube 12 is fitted into the recessed end of an adjustable screw 38 which is threaded through an extending arm 32a of carrier 32. Since the opposite end of screw 38 is equipped with a small knurled finger portion 38a and a larger knurled finger portion 38b and the parts are in an aligned arrangement, a technician may readily press the closed end of a hematocrit tube against the plunger 34 and then slip the opposite end into the recessed end of screw 38 after which the spring-pressed tube may be adjusted longitudinally as desired by actuating knurled part 38a or part 38b as required.

The movable supporting block 36 is pinned or otherwise fixedly secured to a longitudinally extending guide rod 40 which is arranged, in turn, to slide longitudinally in a pair of fixed spaced bearing supports 42 secured to plate 20. Since the rod 40 and tube 12 are thus arranged in parallel relation to each other and since the microscope 21 is mounted directly above the tube 12, block 36 may be moved longitudinally to successively expose various parts of the tube 12 in the object field of the microscope. One or more removable hold-down pins 33 may be used in carrier 32 and arranged so as to have their inner ends overlie tube 12.

The block 36 has an integral arm 36a extending out appreciably from the right side of the main body portion thereof and an integral shoulder 36b extending out a lesser amount from the left side of the main body portion; and both are provided with aligned openings. These openings, it will be noted, are purposely disposed so that their common alignment axis is at an angle with respect to rod 40 which is appreciably angularly removed from both the rod 40 and a plane at right angles thereto, as suggested by Fig. 2. The purpose of this angularity will be hereinafter described. An elongated adjustment rod 44 has sliding engagement with the opening in arm 36a. The opening in the shoulder portion 36b, however, is somewhat larger so as to rotatably receive the restricted inner end of an elongated tubular member 46 which is restrained against axial movement by a collar 47. Member 46 has threads upon its inner surface for engagement with the threaded end of rod 44 so that an extensible arrangement is provided.

Figure 3:
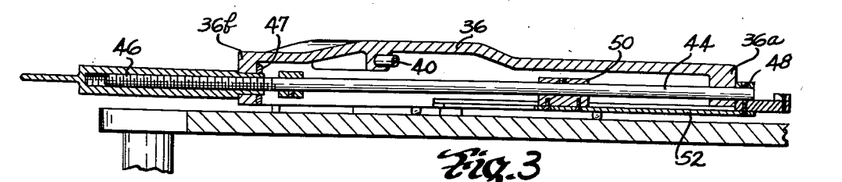
Fig. 3 is a vertical sectional view taken substantially upon section-line 3—3 of Fig. 2 and looking in the direction of the arrows.

The adjustment rod 44, as clearly indicated in Fig. 3, has secured thereto at spaced points small securing blocks 48 and 50 which are, in turn, attached to a large computer and scale board 52, the purpose and details of which will be later more fully described. Accordingly, if the tubular member 46 were to be rotated either by the larger knurled part 46a (for slow adjustment) or by the smaller knurled part 46b (for more rapid adjustment) the computer board 52 will be moved in a direction parallel to the adjustment rod 44. At the same time, the spacing between board 52 and hematocrit tube 12 in groove 30 will be varied. The upper part of computer board 52 is supported on plate 20 by feet 52a.

The computer board 52 (see Fig. 1) has, along its longer straight right side edge, a vertically extending scale 53 indicating equal divisions thereon, as indicated between 10 and 90. Above 90 and below 10, these divisions are removed somewhat, for convenience, from this straight line scale 53 and, accordingly, are closer together. It will be noted that in Fig. 2 a lower line 54 and an upper line 56 extending from parts of this scale, in effect, intersect at a point 58. Scale 53 will be hereinafter referred to as the percent scale and lines 54 and 56 indicate the zero and 100 percent values thereon. (For reasons to be mentioned later, this scale has been extended to also include values up to 115%.)

The point 58 indicates a vertical axis or center about which hinge means 60, having one part 60a thereof fixedly secured to the adjustment rod 44 and having the other part 60b thereof fixedly secured to a control rod 62, is arranged to pivot while rod 62 is being swung in a generally horizontal direction by the user of the apparatus. The control rod 62 carries on its outer free end a transparent plastic blade 63 which is arranged to overlie the computer board 52 and this blade has engraved or otherwise scribed thereon a reference line 64 which is aligned with hinge axis 58. Thus, regardless to what angular position overlying the computer board 52 the blade 63 rigidly connected to control rod 62 may be swung, the line 64 will always "point" toward axis 58. The free end of the blade 63 extends beyond the computer board for convenience of operation and, together, rod 62 and blade 63 constitute a main control arm 66 for the apparatus.

Slidably positioned about control rod 62, and intermediate hinge part 60b and blade 63 (see Figs. 1 and 4), is a coupling 68 which has a short projecting portion 70 extending outwardly from the nearer side thereof. In this projection 70 is formed a vertically arranged opening into which the upper end of a pivot post 72 fits.

A nylon sleeve 73 in the projection 70 and about the post 72 reduces friction and wear between these relatively moving parts. The lower end, however, of this post extends through a hole in the main supporting plate 20 and suitable means are provided for fixedly securing the post in place therein.

Thus, since post 72 is fixed, horizontal swinging movement of the free end of the control arm 66, as indicated by double-headed arrow 74 in Fig. 1, will tend to cause the end of rod 62 connected to hinge part 60b to swing in an opposite direction. However, since hinge means 60 cannot move laterally except when moved by rotation of tubular member 46, a small amount of sliding movement in one direction or the other between collar 68 and rod 62 will take place as arm 66 is moved, for example, from the lower position shown in Fig. 2 to an intermediate position shown in Fig. 1, or to the upper position shown in Fig. 8.

Figure 8:
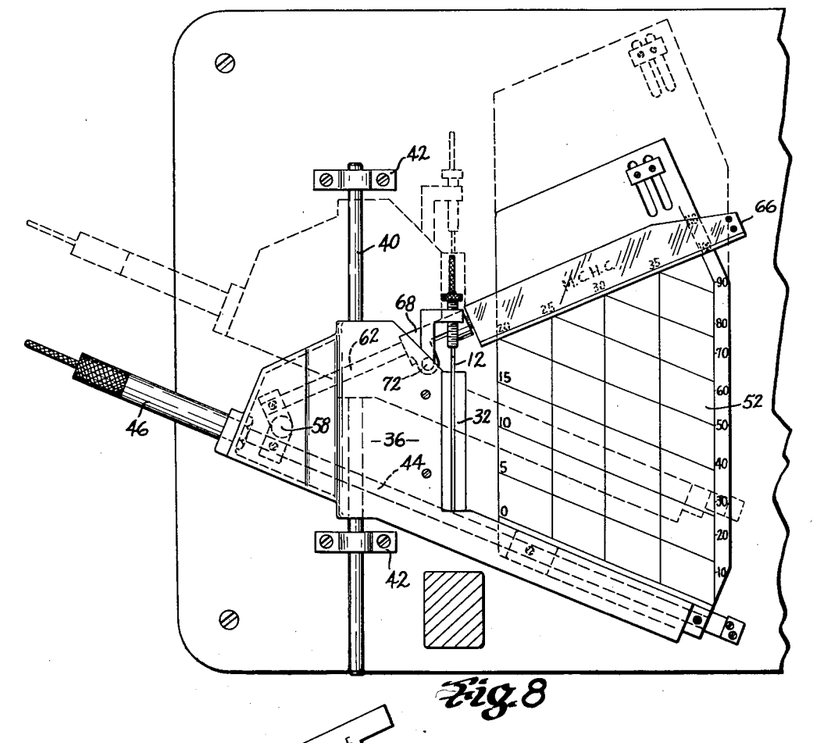
Fig. 8 is a view somewhat like that of Fig. 2 but showing parts of the apparatus in a different position of adjustment.

An inspection of these last-mentioned figures will show that, as arm 66 is moved from its zero position on the computer board 52 upwardly to the 100% mark thereon (swinging at such time about post 72), main supporting block 36, tube 12 and computer board 52 will travel downwardly, that is, toward the user of the apparatus, being guided in this action in a straight line by rod 40 sliding in fixed bearing supports 42. These bearing supports may likewise be provided with nylon sleeves to reduce friction and wear, if desired. Of course, it will be kept in mind that during such movement, the microscope 21 focused upon the tube 12 will remain stationary and the tube 12 will move in a direction normal to the cross hair therein to successively expose all parts of the sample.

If each centrifuged sample of whole blood to be measured in a hematocrit tube 12 were always of exactly the same length, it would be a rather simple matter to accurately measure under a microscope the related proportions of the blood components therein, as for example, on a hundred percent scale of a length equal to the total length of the sample. However, samples may vary appreciably in length and tubes of two different lengths need to be cared for, and such make the apparatus for measuring the components of many different blood samples more complex, particularly when it is appreciated that for convenience of operation and freedom from vibrations in the object field, the microscope must be mounted in fixed relation to the main supporting plate and the tube 12 moved relative thereto.

Figure 9:
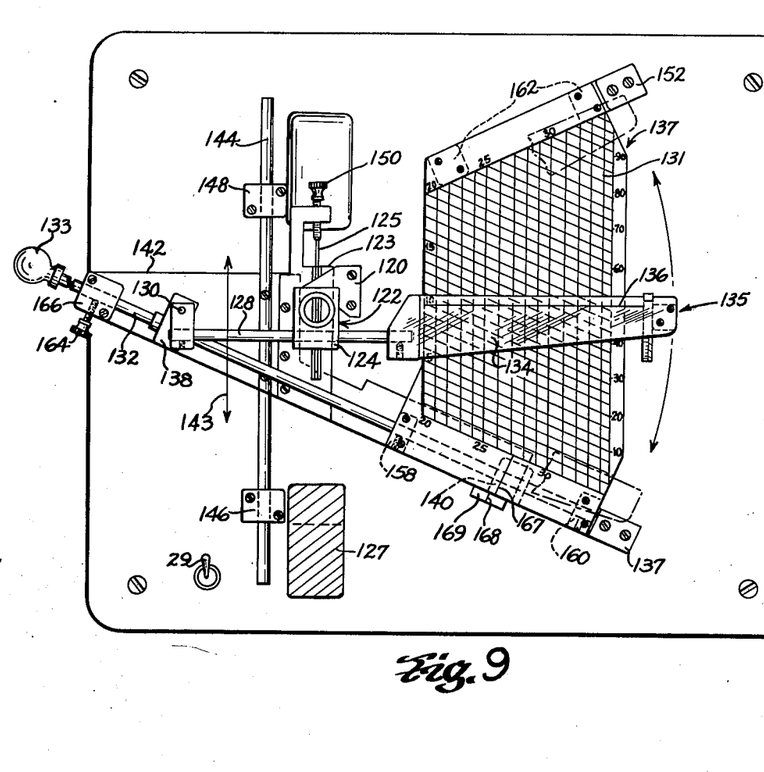
Fig. 9 is a plan view similar to Fig. 2, but showing a modified form of the invention.

In the apparatus disclosed in Fig. 1 and also in the modification thereof disclosed in Fig. 9, various lengths of samples in either large or small hematocrit tubes can be easily and accurately moved and aligned with the cross hair of the stationary microscope and then scale readings appreciably mechanically magnified observed with high precision. Since both modifications have features in common and also differences which should be noted, it is desirable to describe at this time the apparatus of Figs. 9 and 10 also before going into a description of the necessary adjustment and manner of use of the apparatus which incidentally are the same for both modifications.

Figure 10:
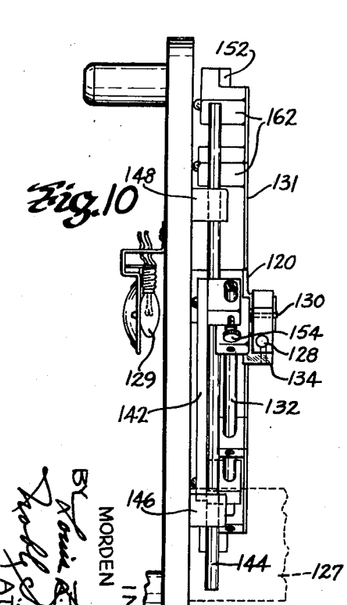
Fig. 10 is a side elevational view of the structure of Fig. 9 as viewed from the left side thereof and with certain parts broken away.

In Figs. 9 and 10, a modified form of apparatus is shown. While in certain respects, this apparatus and the apparatus disclosed in Fig. 1 are similar, one important difference resides in the fact that instead of a movable supporting block 36 overlying rod 62 of the movable control arm 66 and the fixed post 72 about which it swings, the construction in Figs. 9 and 10 is such that a fixed bracket 120 which is connected to the main supporting plate 20, in effect, constitutes one part of a hollow pivot means 122, the other pivotally movable collar-like part 124 thereof being arranged to swing about the fixed lower part 120 and about the hollow center of the pivot means. As is clear from inspection of Fig. 9, hematocrit tube support 123 and hematocrit tube 125 in this embodiment are so positioned below this pivot means that the line of sight of an associated microscope carried on arm 127 extends downwardly through the center of this hollow pivotal means. A light source 129 is provided below carrier 123 and in alignment with the microscope directed downwardly through hollow pivot means 122. Switch 29 and lamp 31 may also be provided.

The movable collar part 124 slidably receives a rod 128. This rod is, in turn, pivotally connected on its left end by hinge means 130 including a block 138 fixedly secured to slide rod 132 which carries a handle 133 on an end portion thereof. Fixed connections are provided between rod 128 and this hinge means and between slide rod 132 and said means. Rod 128 carries on its other end a transparent blade 134 overlying computer board 131 and this blade and rod 128 together, like the arrangement in Fig. 1, form a control arm 135 for the user. Blade 134 differs, however, from blade 63 in that reference line 136 thereon is near the upper edge of the blade instead of the lower edge, and thus is aligned with the axis of hinge means 130. Slide rod 132 is guided in guide blocks 166 and 140 (which may be nylon sleeve equipped like part 70, Fig. 4) fixed to a movable main block 142 which, in turn, is guided in a fore and aft direction as indicated by arrow 143 by an elongated rod 144 having sliding engagement with fixed bearings 146 and 148 secured to main plate 20 and which may likewise be nylon sleeve equipped. (It is well to note, at this time, that all of the slidable and pivotal connections in the structures of Figs. 1 and 9 can be nylon sleeve equipped, if desired.) Carrier 123 is fixed to and moves with movable block 142 during vertical adjustment of the hematocrit tube 125. Computer board 131 is secured to rod 132 by connecting means 158 and 160 and the upper part of the board is supported on one or more slidable legs 162 secured thereto and resting on plate 20.

As in the previous embodiment, "zero" adjustment of the hematocrit tube 125 is effected by screw means 150 while sighting through the microscope and while arm 135 is in its zero position contacting stop 137. Thereafter, the 100% adjustment to align the cross hair with the top of the plasma in the tube 125 will be brought about by sliding rod 132 laterally in its guide blocks 166 and 140 while arm 135 is held in its 100% position in contact with upper stop 152. Of course, rod 128 will slide in collar-like part 124 at this time. After this adjustment, a set screw 164 in guide block 166 fixed on movable block 142 is tightened so as to engage and lock rod 132 against sliding movement. Otherwise, the operations of this embodiment are substantially like those mentioned above relative to Fig. 1. It will be noted, however, that while the fixed pivotal axis for control arm 135 in Fig. 9 is, at all times, coincident with the optical axis of the associated microscope focused on hematocrit tube 125, the optical axis of the microscope in Figs. 1 and 2 focused on hematocrit tube 12 is not coincident with pivot means 72. In Fig. 9, when arm 135 is in its zero position or its 100% position, the cross hair of the microscope will not only appear to be aligned with an end of the sample in the hematocrit tube but also the zero and 100% lines at such times, if extended to pivotal axis 130, would, in effect, pass through such a point of intersection. In other words, it might be said that the sample in the tube when so adjusted exactly fits between the zero and 100% lines.

In Figs. 1 and 2, such is not the case. Instead, Fig. 2 shows tube 12 and thus the microscope axis appreciably to the right of fixed pivot means 72. In fact, as will presently appear, while the hematocrit tube must always be beneath the microscope, the lateral distance between the tube and the fixed pivot may be varied appreciably without departure from the principles of the invention.

Figure 11:
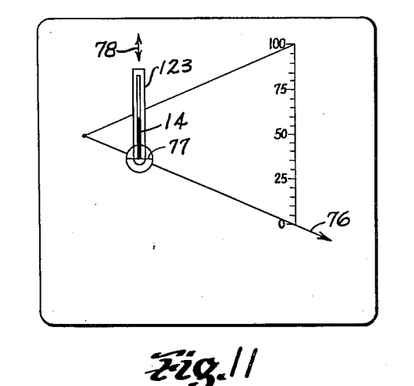
Figs. 11, 12, 13 and 14 are diagrammatic views to aid in better understanding of the principles of operation of the invention.

If the apparatus of Fig. 9, for example, is now to be used to measure component values of a centrifuged blood sample of any convenient length in the tube 125 (light 129 having been turned on), screw 150 will be rotated while arm 135 is in its zero position until the bottom of the red cell column in the tube appears to have contacted the cross hair of the microscope. A diagrammatic representative of this first position of adjustment with the bottom of the red cell column 14 in the tube located on the zero line of the scale is shown in Fig. 11; arrow 76 representing the zero position of arm 135, numeral 77 indicating the cross hair at the bottom of the column and double-headed arrow 78 indicating the path along which the tube is moved by screw 150 to effect zero alignment of its lower end.

Figure 12:
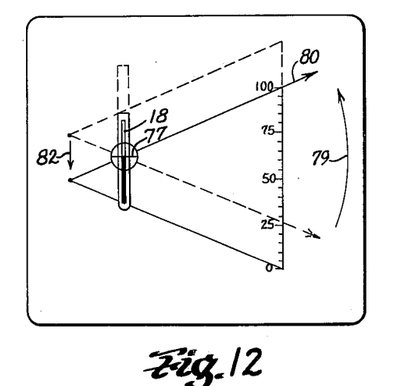

If arm 135 in Fig. 9 is then swung upwardly as suggested by curved arrow 79 in Fig. 12, the support 142, tube 123 and computer board 131 will all move simultaneously downwardly. In Fig. 12 the new 100 percent position of arm 135 is indicated by solid arrow 80, the new and old positions of parts are indicated respectively by the solid and dotted lines therein and the direction of movement of same is indicated by arrow 82.

Figure 13:
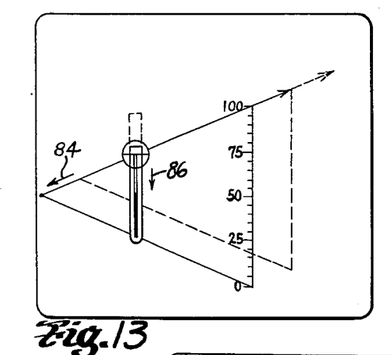

Note, however, that the top of the plasma 18 of the sample in the tube 123, as shown in Fig. 12, is not aligned with the 100% line although the cross hair 77 is. To bring about alignment of the top of the sample with the 100% line, it is desirable at this time to hold the control arm 135 in place overlying the 100% line while moving the handle 133 on rod 132 and watching movement of tube 123 through the microscope. Movement of handle 133 in this case will be such as to draw the rod 132 toward the left. Since, as stated, pivot means 120 will not move and since control arm 135 cannot swing about means 120 during this movement of rod 132, a sliding action of control rod 128 in and relative to collar-like part 124 must take place. This sliding action is toward the left side and in a somewhat downward direction as suggested by arrow 84 in Fig. 13. This, of course, will likewise shift the pivotal axis 130 toward the left. However, since the angular relation between rods 128 and 132 under such conditions cannot change, rod 132 and computer board 52 will also be shifted toward the left and downwardly, and simultaneously the main supporting block 142 will be forced to move downwardly carrying with it the tube 123, as suggested by arrow 86 in Fig. 13. This movement of handle 133 will be continued until the upper end of the plasma 18 in tube 123 exactly coincides with the cross hair in the microscope field. The new positions of the mentioned parts of the apparatus is suggested by the solid lines in Fig. 13 and their previous positions by the dotted lines therein. In effect, the apparatus has now been adjusted to "fit" the size of the sample in tube 123.

Figure 14:
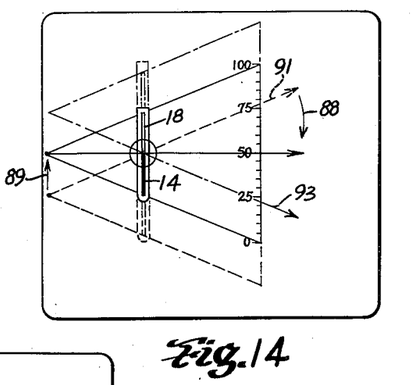

Thereafter, if the control arm 135 is moved downwardly, the reference line 136 on the blade 134 will indicate on vertically disposed percent scale 137 on the computer board 131 that percentage of the total volume of the sample occupied by the red cells. This is because as the control arm 135 moves down, as indicated by arrow 88 in Fig. 14, the mentioned parts will move upwardly, as indicated by arrow 89. In Fig. 14, wherein a sample having half of its total length indicated as occupied by red cells and half by plasma, it will be noted that when the cross hair of the microscope is at the top of the red cell column, the reference line on the control arm will indicate a 50% value on the scale. Arrow 91 and the dash lines in this figure indicate the 100% position of the parts while arrow 93 and the dot-dash lines indicate the zero position thereof.

Stated briefly, the apparatus of Fig. 9 in use will be first adjusted to place the bottom of the blood sample in the tube 123 in alignment with the microscope cross hair while control arm 135 is at the zero line of the scale, then adjusted to place the top of the sample at the 100% line of the scale, and then control arm will be moved to move the movable support 142 and the tube 123 so that any desired line of demarcation between different component parts of the centrifuged blood sample therein will be brought into coincidence with the cross hair, after which a scale reading can be made.

Figure 16:
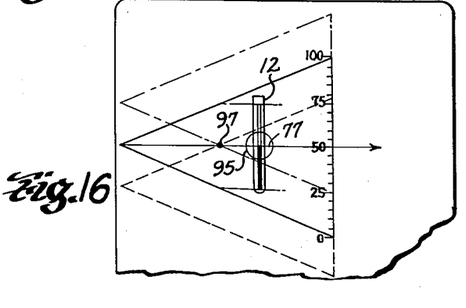
Fig. 16 is a diagrammatic view somewhat like Fig. 14.

With reference to the modification shown in Figs. 1 and 2, it has already been noted that the microscope axis is not concentric with the fixed axis about which control arm 66 swings, although such is the case in the construction disclosed in Figs. 9 and 10 and explained in Figs. 11–14. Nevertheless, equivalent results are provided by both modifications. In Fig. 16 (which corresponds to the Fig. 1 construction) is shown an arrangement much like that shown in Fig. 14 except hematocrit tube 12 and microscope, represented by the circle 95, are appreciably to the right of fixed pivot point 97. Even though it cannot be said that in this arrangement the zero line and the 100% line of the scale, in effect, coincide with the opposite ends of the sample after the first and second-mentioned adjustments have been made, nevertheless, the apparatus, by such adjustments, will have been "fitted" to the size of the sample and percentage values indicated on the scale 53 for component parts of the sample in the tube will be the same as those given by the Fig. 9 construction.

This is because the tube and microscope have merely been located laterally of the fixed pivot, instead of at the pivot, and while circle 95 and cross hair 77 therein do not shift during movement of the control arm, the tube 12 does shift vertically, and the amount of this vertical shifting will be the same as that provided in the Fig. 9 construction. In fact, the tube 12 and microscope could be located at other convenient locations and the structure will still give correct values as long as the tube shifted vertically with the vertical shifting of the above-mentioned parts.

In Fig. 1 a lower stop 92 is provided in fixed relation to a lower part of board 52 for contact by control arm 66 when it reaches its zero line position. A similar stop could likewise be provided, if desired, for its 100% position. It is preferred, however, to provide instead, an adjustable stop 94 (see also Fig. 2) which is movable in a pair of slots 96 in an upper part of board 52, and this stop may be clamped in various positions of adjustment relative to the percent scale 53, for purposes which will presently appear, by suitable means 101.

As stated previously, the centrifuged tube of Fig. 1A, for example, contains a column of red corpuscles 14 at the bottom of the tube, a buffy coat 16 next to the red corpuscles and plasma 18 at the top. At times, it is highly desirable to accurately measure the percentage value of this buffy coat or layer 16 as well as the red cells and clear plasma; and, for this reason, there is associated with the control arm 66 a movable auxiliary scale 103 (see Figs. 1, 2, 5, 5A and 6) which is provided with a hooked upper end 105 (Fig. 6) including a connecting end piece 104 so that it may be carried, at times, by the swing movement of arm 66. Upon the lower side of this auxiliary scale is cemented a small permanent magnet 107 with the result that should the auxiliary scale be moved upwardly from the zero line 54 by and on the arm 66 to the dotted line position shown in Fig. 5, it will be attracted and retained near the outer end of arm 66 by a soft iron block 109 secured beneath the end of the arm 66. At such times, the auxiliary scale will be spaced from intermediate parts of the scale 53 on computer board 52.

Thus, the arrangement of parts is such that if the control arm 66 is moved first to make the zero and 100% adjustments, scale 103 will be carried with it near its outer end. Thereafter, if the control arm 66 is carefully adjusted so that the top of the buffy coat coincides with the microscope cross hair, the auxiliary scale may then be pushed inwardly along the beveled edge 66a of the arm 66 and into contact with the board 52, making sure, of course, that scale 103 is also being firmly pressed so as to cause the side of small pin 103a to contact bevel 66a of control arm 66. Scale 103 will then tend to remain stationary adjacent main scale 53 since a soft iron stiffening bar, or the like, 52b (Fig. 6) is disposed beneath the computer board 52 and adjacent the right-hand straight edge portion thereof.

The next adjustment is to move the control arm 66 downwardly, while the auxiliary scale remains stationary, until the microscope cross hair coincides with the line of demarcation between the buffy coat 16 and the red cell column 14. Observation of this line may be aided by moving switch 29 to its opposite position so that oblique illumination from lamp 31 will be used instead of the transmitted light from bulb 27.

When these four adjustments have been completed, a reading on the main scale at the location where reference line 64 crosses will indicate directly the volume percentage or hematocrit value of the hemoglobin in the sample and a reading on the auxiliary scale at reference line 64 will indicate directly the volume percentage of the buffy coat of the sample. The sum of these two values subtracted from 100%, of course, will indicate the volume percentage of plasma of the sample.

Figure 5A:
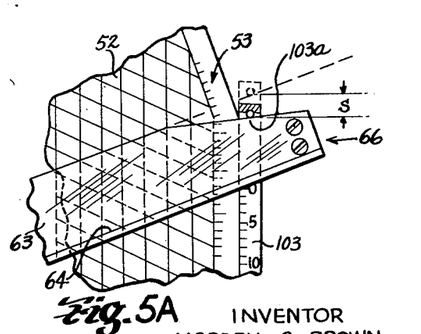

The reason for providing the beveled surface 66a on the outer upper edge of arm 66 is to assure that a correct reading for the scale 103 will be automatically obtained. This will be apparent from a consideration of Figs. 5 and 5A. In Fig. 5, reference line 64 is at the 50% mark on scale 53 and the zero mark on the auxiliary scale 103 is directly opposite. However, when the arm 66 has been moved upwardly appreciably, as indicated in Fig. 5A, and if the arm 66 were not so beveled, the small scale contact pin 103a would have to move up to the dotted line position indicated, and the zero mark on the auxiliary scale would be well above the intersection of the reference line 64 with the main scale. However, by providing the beveled surface 66a and by having it slope downwardly the right amount, a compensating arrangement is produced wherein the zero mark on the auxiliary scale will always be exactly opposite the intersection mentioned above. In Fig. 5A, the amount of compensation so introduced by the beveled surface 66a is indicated by the vertical space S between solid and dotted line positions of small contact pin 103a.

In the blood sample mentioned above, no anticoagulant has been used. It might be preferred, however, to use either a dry or liquid anticoagulant, and such may be selected from known materials such as oxalates, heparin and sequestrene. If a dry anticoagulant is used, the volume of the sample will remain substantially unchanged and the procedure will be like that given above. A preferred anticoagulant, however is EDTA, and this is a salt solution from ethylenediamine tetraacetic acid. When this liquid anticoagulant is used with a blood sample, it is preferred to add same to the sample in an amount of approximately 10% by volume. This added amount of anticoagulant can be conveniently measured on the small scale 108 shown in Fig. 2 extending upwardly from the 100% line 56 and stop 94 can thus be set once in accordance with the percent of anticoagulant to be used in successive samples. Since the liquid anticoagulant is substantially all contained (after centrifuging) in the plasma and substantially none in the red cell column 14 and since the sample in the tube has thus been increased in volume by the addition of the EDTA so as to read approximately 111% on the main scale 53, the reading for percent red cell volume and for the percent buffy coat volume obtained by the method steps mentioned above can be read directly from scales 53 and 103 and the percent volume of plasma will be equal to 100% minus the sum of these two values.

Since the mean cell hemoglobin concentration in grams per 100 ml. multiplied by the hematocrit value of a blood sample will give the hemoglobin concentration for the sample, it is possible to immediately determine the mean cell hemoglobin concentration when the hemoglobin concentration value of the sample is known or can be conveniently obtained by other means and the hematocrit value is measured by the apparatus herein described.

On the computer board 52 in Figs. 1 and 2 has been entered vertically along the left-hand side thereof a scale 110 of different constant values for hemoglobin concentration and slanting lines 112 indicate these constant values at different locations across the board. Accordingly, if the user enters the hemoglobin value for the blood samples being tested (in gram per 100 ml.) on the left-hand scale and follows the slanting line for the value down to the point where it intersects with the reference line 64 set on the correct hematocrit value for the sample, then the mean cell hemoglobin concentration for the sample may be read directly upon another scale 111 indicating MCHC along the top of the board.

For linear measurements along the length of the hematocrit tube 12, a small reference line 113a (see Fig. 2) is provided and this is placed on a lower part of the board 52 so that it may be moved into coincident relation with a second small reference line 113b on the arm 36a of the movable block 36. When these marks are aligned, a predetermined mechanically magnified value will be provided on scale 53. For example, the setting could be such as to indicate a 1 mm. travel along the tube 12 for every 5 units of travel of the arm 66 along the scale 53, with each unit equal to 10 mm.

Figure 15:
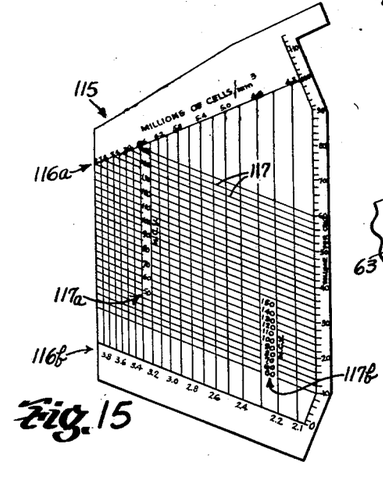
Fig. 15 is a modified form of computer board which may be used in said improved apparatus of Figs. 1 or 9.

In Fig. 15, a different computer board 115 has been shown and this might be used, for example, in cases wherein the red blood cell count of a sample is known instead of the hemoglobin value thereof and the mean red cell volumes (MCV) is to be determined. Since the mean cell volume for a sample multiplied by the red blood cell count of a cubic micron of the sample is equal to the hematocrit value thereof, it will be readily appreciated that when the hematocrit value has been accurately measured by apparatus herein described and the count is known or available, the mean cell volume may be immediately obtained from computer board 115. On the series of vertically spaced slanting lines 117, MCV values are given. Red cell counts in millions of cells per cubic millimeter from 4 to 8 million have been indicated on scale 116a along the top and from 2 to 4 million on scale 116b along the bottom. Upon entering the count for a given blood sample between 4 and 8 at the top and proceeding down to the reference line 64 set at the correct hematocrit value for the sample, the mean cell volume therefor can be immediately read on the left-hand MCV scale 117a on the board. Count values between 2 and 4 million will be entered at the bottom and proceeding up to the reference line 64 set at the correct hematocrit value read the MCV value on scale 117b at the right.

It may be possible, at times, to observe a clear line of demarcation in the buffy coat between the white blood cells and platelets thereabove, and values for both white cells and platelets can be read successively on the auxiliary scale 103 by first zeroing the scale by aligning the cross hair with the top of the platelet volume (top of buffy coat, as before) and then moving arm 66 downwardly, while scale 103 remains fixed, to align the cross hair with the top of the white blood cell volume. Then, read scale 103 for the percent volume of platelets. Thereafter, the small scale is zeroed by moving same downwardly to contact control arm 66 and then this arm is moved down to the division line between the white and red blood cells. The small scale is again read for the percent volume of white cells. The red cell volume can also be read at this time on the large scale 53.

An adjustable stop 94, a scale extension 103 and a beveled edge 66a have been described as improvements in connection with the apparatus in Figs. 1 and 2. It should be appreciated that the apparatus disclosed in Figs. 9 and 10 could likewise be provided with similar improvements, if desired. Also, a computer board like that in Fig. 15 could be used equally well with the apparatus of Figs. 1, 2 and Figs. 9, 10.

Another use to which the above-described apparatus of Figs. 1 and 9 may be put is that of measuring the rates of leucocyte migration into the clotted plasma after centrifuging of the sample. For example, with the lines 113a and 113b (Fig. 2) or lines 167 and 168 on fixed block 169 in Fig. 9 aligned, a zeroed setting of the auxiliary scale 103 at the upper limit of leucocyte migration after a given time would be made and then the arm 66 or arm 135 moved down to the top of the buffy coat. The extent of migration in millimeters would be one-fifth of the reading on the auxiliary scale.

From the foregoing description, it will be apparent that new and improved apparatus for rapidly and accurately determining blood values, such as hematocrit values, percent volume of white blood cell, percent volume of platelets, mean cell hemoglobin concentration, mean cell volume and platelet migration measurements may be made by following the teachings of the present invention, and also appreciated that various changes in the apparatus may be made by those skilled in the art without departing from the spirit of the invention as expressed by the accompanying claims.

Having described the invention, I claim:

1. Apparatus for use in rapidly and accurately determining the hematocrit value of a sample of whole blood, said apparatus comprising a supporting base, a hematocrit tube support positioned thereon, a microscope arm fixedly secured to said base and supporting a microscope above said tube support so as to focus upon a hematocrit tube on said tube support, said microscope including an objective, an eyepiece and a cross hair arranged in transverse relation to the axis of said hematocrit tube, a percent scale carried upon said base, a control arm pivotally secured by hollow pivot means to said base so as to pivot about an axis substantially coincident with the optical axis of said microscope, and having a reference mark thereon movable to different positions along said scale, means for moving said tube axially relative to said tube support to align one end of a centrifugal sample of blood in said tube with the cross hair of said microscope while the reference mark on said control arm remains in a position indicating a zero value on said scale, means for simultaneously moving said tube and tube support so as to align the opposite end of the sample in said tube with said cross hair while the reference mark on said control arm remains in a position indicating a 100% value on said scale, and means interconnecting said tube support and said control arm in such a manner as to cause axial movement of said tube to locate various intermediate parts of said sample in alignment with said cross hair as the mark on said control arm is moved to indicate corresponding intermediate percentage values on said scale.

2. Apparatus for rapidly and accurately determining the hematocrit value of a sample of whole blood, said apparatus comprising a base, means on said base providing a fixed reference line, a carrier for supporting a hematocrit tube for movement relative to said reference line, means for guiding said carrier and tube in a direction parallel to the axis of said tube, a plate having a linear scale including a zero mark and a 100% mark theron, a pair of convergent lines on said plate extending from said marks so as to constitute portions of opposite sides of a triangle whose base is formed by said scale, a control arm for moving said carrier and tube relative to said reference line, said control arm being pivotally connected to a part rigid with said plate substantially at a point corresponding to the apex of said triangle, said control arm also being arranged to pivot about pivot means fixed relative to said base, and having an index mark thereon disposed adjacent said scale, and means for axially altering the positional relation between said carrier and said tube for changing the distance between said carrier and said plate so as to cause the opposite ends of a centrifuged sample in said tube to coincide with said fixed reference line when said control arm is moved respectively to positions indicating zero and 100% values on said scale, whereby said apparatus may be adjusted to correspond to the length of the centrifuged sample in said tube and thereafter may be used to indicate directly on said scale the percentage value of the fractional part of the sample occupied by the red corpuscles thereof.

3. Apparatus for rapidly and accurately determining the hematocrit value of a sample of whole blood, said apparatus comprising a base, means on said base providing a fixed reference line, a carrier for supporting a hematocrit tube for movement relative to said reference line, means for guiding said carrier and tube in a direction parallel to the axis of said tube, a computer board having a linear scale including a zero mark and a 100% mark thereon, a pair of convergent lines on said board extending from said marks so as to constitute portions of opposite sides of a triangle whose base is formed by said scale, a control arm for moving said carrier and tube relative to said reference line, said control arm being pivotally connected to a part rigid with said board substantially at a point corresponding to the apex of said triangle, said control arm also being arranged to pivot about pivot means fixed relative to said base, and having an index mark thereon disposed adjacent said scale, and means for axially altering the positional relation between said carrier and said tube for changing the distance between said carrier and said board so as to cause the opposite ends of a centrifuged sample in said tube to coincide with said fixed reference line when said control arm is moved respectively to positions indicating zero and 100% values on said scale, a first series of lines on said board in predetermined space substantially parallel relation to said tube for indicating mean cell hemoglobin concentration values for blood samples, and a second series of lines on said board in predetermined spaced substantially parallel relation to the convergent line on said plate extending from said zero mark for indicating hemoglobin concentration values of blood samples, whereby said apparatus may be adjusted to correspond to the length of the centrifuged sample in said tube and thereafter may be used to indicate directly on said linear scale the percentage value of the fractional part of the sample occupied by the red corpuscles thereof and also used to determine the mean cell hemoglobin concentration value or hemoglobin concentration value of the sample when one or the other of the last two mentioned values is also known.

4. Apparatus for rapidly and accurately determining the hematocrit value of a sample of whole blood, said apparatus comprising a base, means on said base providing a fixed reference line, a carrier for supporting a hematocrit tube for movement relative to said reference line, means for guiding said carrier and tube in a direction parallel to the axis of said tube, a computer board having a linear scale including a zero mark and a 100% mark thereon, a pair of convergent lines on said board extending from said marks so as to constitute portions of opposite sides of a triangle whose base is formed by said scale, a control arm for moving said carrier and tube relative to said reference line, said control arm being pivotally connected to a part rigid with said board substantially at a point corresponding to the apex of said triangle, said control arm also being arranged to pivot about pivot means fixed relative to said base, and having an index mark thereon disposed adjacent said scale, and means for axially altering the positional relation between said carrier and said tube and for changing the distance between said carrier and said board so as to cause the opposite ends of a centrifuged sample in said tube to coincide with said fixed reference line when said control arm is moved respectively to positions indicating zero and 100% values on said scale, a first series of lines on said board in predetermined spaced substantially parallel relation to said tube for indicating red cell count in millions per cubic millimeter for blood samples, and a second series of lines on said board in predetermined spaced substantially parallel relation to the convergent line on said board extending from said zero mark for indicating mean cell volume values of blood samples, whereby said apparatus may be adjusted to correspond to the length of the centrifuged sample in said tube and thereafter may be used to indicate directly on said linear scale the percentage value of the fractional part of the sample occupied by the red corpuscles thereof and also used to determine the red cell count value or mean cell volume value of the sample when one or the other of the last two mentioned values is also known.

5. Apparatus for use in accurately determining the percentage volumes of components in a sample of whole blood, said apparatus comprising a supporting base, means secured to said base and providing a fixed reference line, means for supporting a hematocrit tube for axial movement relative to said reference line so as to align various parts of a centrifuged sample of blood in said tube with said reference line, a control arm for moving said tube support, adjustable means for moving said tube relative to said tube support so as to cause one end of a sample in said tube to coincide with said reference line while said control arm is retained in a zero position upon a percentage scale adjacent thereto, means for moving said tube and tube support while said control arm is retained in a position indicating a 100% value on said scale to effect coincidence between said reference line and the opposite end of said sample in said tube, said control arm being pivotally secured to said base and so operatively connected to said tube support as to cause axial movement of said tube to locate various intermediate parts of said sample in alignment with said reference line as said control arm is proportionately moved to various intermediate positions indicating percent values along said scale, an auxiliary scale for indicating percent values of the buffy coat of said sample, said auxiliary scale being adapted to be carried by said control arm in spaced relation to said percentage scale, and means associated with said auxiliary scale for holding said auxiliary scale stationary adjacent said percentage scale when said auxiliary scale has been moved along said control arm and into adjacent relation with said percentage scale, whereby when said control arm is thereafter moved toward said zero mark while said auxiliary scale remains stationary percentage volumes for said buffy coat will be indicated directly upon said auxiliary scale.

6. Apparatus for use in rapidly and accurately determining the hematocrit value of a sample of whole blood, said apparatus comprising a base, a support positioned on and arranged for rectilinear movement relative to said base, means on said support for positioning a hematocrit tube in substantially parallel relation to the direction of movement of said support, a microscope arm fixedly secured to said base and supporting a microscope above said tube, said microscope including an objective, an eyepiece and a cross hair arranged in transverse relation to the axis of said tube, a laterally shiftable plate carried by said support and having a graduated scale including first and second main reference marks in spaced relation thereon, a pair of convergent lines on said plate extending in such directions from said marks as to constitute portions of opposite sides of a triangle, a control arm pivotally connected to a part rigid with said plate substantially at the effective point of intersection of said opposite sides, said control arm also being pivotally and slidably connected to a fixed part on said base and having a line thereon movable to different positions along said scale, means for adjusting said tube axially relative to said support to align one end of a centrifuged sample of blood in said tube with the cross hair of said microscope while said line on said control arm is in a position adjacent one of said main reference marks on said scale, and means for laterally adjusting said plate relative to said base so as to align the opposite end of the centrifuged sample of blood in said tube with said cross hair while the line on said control arm is in a position adjacent the other of said main reference marks on said scale, whereby said control arm may thereafter be used to adjust various parts of said sample into alignment with said cross hair and to simultaneously indicate upon said scale the proportional values of said sample.

7. Apparatus for use in rapidly and accurately determining the hermatocrit value of a sample of whole blood, said apparatus comprising a base, a support positioned on and arranged for rectilinear movement relative to said base, means on said support for positioning a hematocrit tube in substantially parallel relation to the direction of movement of said support, a microscope arm fixedly secured to said base and supporting a microscope above said tube, said microscope including an objective, an eyepiece and a cross hair arranged in transverse relation to the axis of said tube, a laterally shiftable plate carried by said support and having a graduated scale including first and second main reference marks in spaced relation thereon, a pair of convergent lines on said plate extending in such directions from said marks as to constitute portions of opposite sides of a traingle, a control arm pivotally connected to a part rigid with said plate substantially at the effective point of intersection of said opposite sides, said control arm also being pivotally and slidably connected to a fixed part on said base laterally disposed to one side of the plane containing the axis of the microscope and the axis of said hematocrit tube and said control arm having a line thereon movable to different positions along said scale, means for adjusting said tube axially relative to said support to align one end of a centrifuged sample of blood in said tube with the cross hair of said microscope while said line on said control arm is in a position adjacent one of said main reference marks on said scale, and means for laterally adjusting said plate relative to said base so as to align the opposite end of the centrifuged sample of blood in said tube with said cross hair while the line on said control arm is in a position adjacent the other of said main reference marks on said scale, whereby said control arm may thereafter be used to adjust various parts of said sample into alignment with said cross hair and to simultaneously indicate upon said scale the proportional value of said sample.

8. Apparatus for use in rapidly and accurately determining the hematocrit value of a sample of whole blood, said apparatus comprising a base, a support positioned on and arranged for rectilinear movement relative to said base, means on said support for positioning a hematocrit tube in substantially parallel relation to the direction of movement of said support, means on said base providing a fixed reference line arranged in transverse relation to the axis of said tube, a laterally shiftable plate carried by said support and having a graduated scale including first and second main reference marks in spaced relation thereon, a pair of convergent lines on said plate extending in such directions from said marks as to constitute portions of opposite sides of a triangle, a control arm pivotally connected to a part rigid with said plate substantially at the effective point of intersection of said opposite sides, said control arm also being pivotally and slidably connected to a fixed part on said base and having a line thereon movable to different positions along said scale, means for adjusting said tube axially relative to said support to align one end of a centrifuged sample of blood in said tube with said fixed reference line while the line on said arm is in a position adjacent one of said main reference marks on said scale, and means for laterally adjusting said plate relative to said base so as to align the opposite end of the centrifuged sample of blood in said tube with said fixed reference line while the line on said arm is in a position adjacent the other of said main reference marks on said scale, whereby said arm may thereafter be used to adjust various parts of said sample into alignment with said fixed fixed reference line and to simultaneously indicate upon said scale the proportional values of said sample.

9. Apparatus for use in rapidly and accurately determining the hematocrit value of a sample of whole blood, said apparatus comprising a base, a support positioned on and arranged for rectilinear movement relative to said base, means on said support for positioning a hematocrit tube in substantially parallel relation to the direction of movement of said support, means on said base providing a fixed reference line arranged in transverse relation to the axis of said tube, a laterally shiftable plate carried by said support and having a graduated scale including a zero reference mark and a 100% reference mark adjacent opposite ends of said scale, a pair of convergent lines on said plate extending in such directions from said marks as to constitute portions of opposite sides of a triangle, a control arm pivotally connected to a part rigid with said plate substantially at the effective point of intersection of said opposite sides, said control arm also being pivotally and slidably connected to a fixed part on said base and having a line thereon movable to different positions along said scale, means for adjusting said tube axially relative to said support to align one end of a centrifuged sample of blood in said tube with said fixed reference line while the line on said arm is in a position adjacent one of said reference marks on said scale, a fixed stop for said arm disposed on said plate adjacent the zero reference mark on said scale, an adjustable stop for said arm disposed on said plate near the opposite end of said scale and adjustable into any one of various stop positions at different distances from the 100% mark on said scale, and means for laterally adjusting said plate relative to said base so as to align the opposite end of the centrifuged sample of blood in said tube with said fixed reference line while the line on said arm is in a position adjacent the 100% reference mark on said scale, whereby said arm may thereafter be used to adjust various parts of said sample into alignment with said fixed reference line and to simultaneously indicate upon said scale the proportional values of said sample.

References Cited in the file of this patent

UNITED STATES PATENTS

| | | |
|---|---|---|
| 581,472 | Shaver | Apr. 27, 1897 |
| 2,840,915 | Drummond et al. | July 1, 1958 |